(12) United States Patent
Bulkowski et al.

(10) Patent No.: US 8,799,248 B2
(45) Date of Patent: Aug. 5, 2014

(54) REAL-TIME TRANSACTION SCHEDULING IN A DISTRIBUTED DATABASE

(76) Inventors: Brian J. Bulkowski, Menlo Park, CA (US); Venkatachary Srinivasan, Sunnyvale, CA (US)

(*) Notice: Subject to any disclaimer, the term of this patent is extended or adjusted under 35 U.S.C. 154(b) by 342 days.

(21) Appl. No.: 13/451,551

(22) Filed: Apr. 20, 2012

(65) Prior Publication Data

US 2012/0278293 A1 Nov. 1, 2012

Related U.S. Application Data

(60) Provisional application No. 61/478,940, filed on Apr. 26, 2011.

(51) Int. Cl.
*G06F 17/30* (2006.01)
(52) U.S. Cl.
CPC ................. *G06F 17/30575* (2013.01)
USPC ........................................... 707/703; 707/802
(58) Field of Classification Search
CPC ........... G06F 17/30575; Y10S 707/966; Y10S 707/99941
USPC .................................. 707/703, 748, 781, 802
See application file for complete search history.

(56) References Cited

U.S. PATENT DOCUMENTS

| | | | | |
|---|---|---|---|---|
| 6,691,115 B2* | 2/2004 | Mosher et al. | ......................... | 1/1 |
| 7,783,601 B2* | 8/2010 | Wong et al. | ................... | 707/635 |
| 8,650,155 B2* | 2/2014 | Corbin et al. | ................. | 707/615 |

* cited by examiner

*Primary Examiner* — Cheryl Lewis

(57) ABSTRACT

In one exemplary embodiment, a method of a distributed database system includes the step of receiving a database transaction with a node of the distributed database system. A priority of the database transaction is determined. A load of a transaction queue of the node is determined. The execution of a database transaction is delayed if the load of the transaction queue is greater than a first-water mark. The database transaction is delayed for a specified period. A portion of the database transaction is execution after the specified period. It is determined if the load of the queue is below a second-water mark after the specified period. A remaining portion of the database transaction can be processed if the load of the queue is below the second-water mark.

20 Claims, 7 Drawing Sheets

REAL-TIME TRANSACTION SCHEDULING IN A DISTRIBUTED DATABASE

CROSS-REFERENCE TO RELATED APPLICATIONS

This application claims priority from U.S. Provisional Application No. 61/478,940, titled DISTRIBUTED DATABASE SYSTEM WITH A CLUSTER OF AUTONOMOUS NODES and filed Apr. 26, 2011. The provisional application is hereby incorporated by reference in its entirety.

BACKGROUND

1. Field

This application relates generally to distributed database systems, and more specifically to a system and method of real-time transaction scheduling in a distributed database.

2. Related Art

A transaction comprises a unit of work performed within a database management system (DMS) against a database. The transaction is treated in a coherent and reliable way independent of other transactions. Additionally, in a distributed database system (DDS), transactions can be received from multiple sources (e.g. client applications, other nodes in the DDS, etc.) within a relatively short period of time. Accordingly, a transaction queue can form in the node. Some types of transactions in the queue may have a higher priority than other transactions types. However, scheduling higher priority transactions equally with other transactions can increase system latency.

BRIEF SUMMARY OF THE INVENTION

In one exemplary embodiment, a method of a distributed database system includes the step of receiving a database transaction with a node of the distributed database system. A priority of the database transaction is determined. A load of a transaction queue of the node is determined. The execution of a database transaction is delayed if the load of the transaction queue is greater than a first-water mark. The database transaction is delayed for a specified period. A portion of the database transaction is executed after the specified period. It is determined if the load of the queue is below a second-water mark after the specified period. A remaining portion of the database transaction can be processed if the load of the queue is below the second-water mark. The execution of the database transaction can be delayed if the load of the transaction queue for the period is above the second-water mark. The distributed database system can be a scalable NoSQL database. The upper-limit mark can be determined according a number and/or type of database transactions in the transaction queue.

BRIEF DESCRIPTION OF THE DRAWINGS

The present application can be best understood by reference to the following description taken in conjunction with the accompanying figures, in which like parts may be referred to by like numerals.

DETAILED DESCRIPTION

Figure 1:
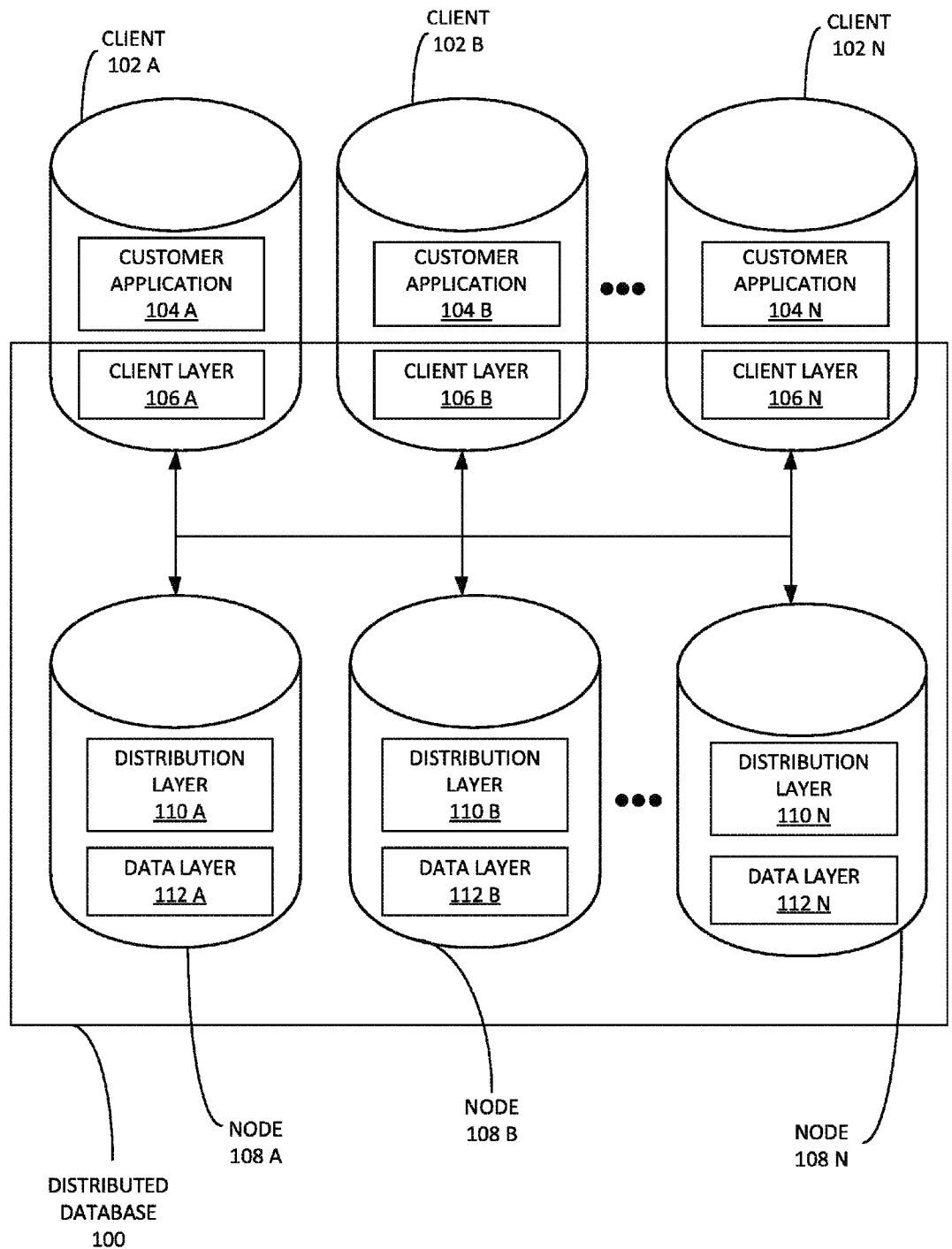
FIG. 1 shows, in a block diagram format, a distributed database system (DDBS) operating in a computer network, according to some embodiments.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart a included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally the order in which a particular method occurs may or may not strictly adhere to the order of the corresponding steps shown.

A. Environment and Architecture

Disclosed are a system, method, and article of manufacture of real-time transaction scheduling in a distributed database.

FIG. 1 shows, in a block diagram format, a distributed database system (DDBS) 100 operating in a computer network according to an example embodiment. DDBS 100 can typically be a collection of databases that can be stored at different computer network sites (e.g. a server node). Each database may involve different database management systems and different architectures that distribute the execution of transactions. DDBS 100 can be managed in such a way that it appears to the user as a centralized database.

DDBS 100 can be a distributed, scalable NoSQL database, according to some embodiments. DDBS 100 can include, inter alia, three main layers: a client layer 106 A-N, a distribution layer 110 A-N and/or a data layer 112 A-N. Client layer 106 A-N can include various DDBS client libraries. Client layer 106 A-N can be implemented as a smart client. For example, client layer 106 A-N can implement a set of DDBS application program interfaces (APIs) that are exposed to a transaction request. Additionally, client layer 106 A-N can also track cluster configuration and manage the transaction requests, making any change in cluster membership completely transparent to the customer application 104 A-N.

Distribution layer 110 A-N can be implemented as one or more server cluster nodes 108 A-N. Cluster nodes 108 A-N can communicate to ensure data consistency and replication across the cluster. Distribution layer 110 A-N can use a shared-nothing architecture. The shared-nothing architecture can be linearly scalable. Distribution layer 110 A-N can perform operations to ensure database properties that lead to the consistency and reliability of the DDBS 100. These properties can include Atomicity, Consistency, Isolation, and Durability.

Atomicity. A transaction is treated as a unit of operation. For example, in the case of a crash, the system should complete the remainder of the transaction, or it will undo all the actions pertaining to this transaction. Should a transaction fail, changes that were made to the database by it are undone (i.e. rollback).

Consistency. This property deals with maintaining consistent data in a database system. A transaction can transform the database from one consistent state to another. Consistency falls under the subject of concurrency control.

Isolation. Each transaction should carry out its work independently of any other transaction that may occur at the same time.

Durability. This property ensures that once a transaction commits, its results are permanent in the sense that the results exhibit persistence after a subsequent shutdown or failure of the database or other critical system. For example, the property of durability ensures that after a COMMIT of a transaction, whether it is a system crash or aborts of other transactions, the results that are already committed are not modified or undone.

In addition, Distribution layer 110 A-N can ensure that the cluster remains fully operational when individual server nodes are removed from or added to the cluster. On each server node, a data layer 112 A-N can manage stored data on disk. Data layer 112 A-N can maintain indices corresponding to the data in the node. Furthermore, data layer 112 A-N be optimized for operational efficiency, for example, indices can be stored in a very tight format to reduce memory requirements, the system can be configured to use low level access to the physical storage media to further improve performance and the likes. It is noted, that in some embodiments, no additional cluster management servers and/or proxies need be set up and maintained other than those depicted in FIG. 1.

Figure 2:
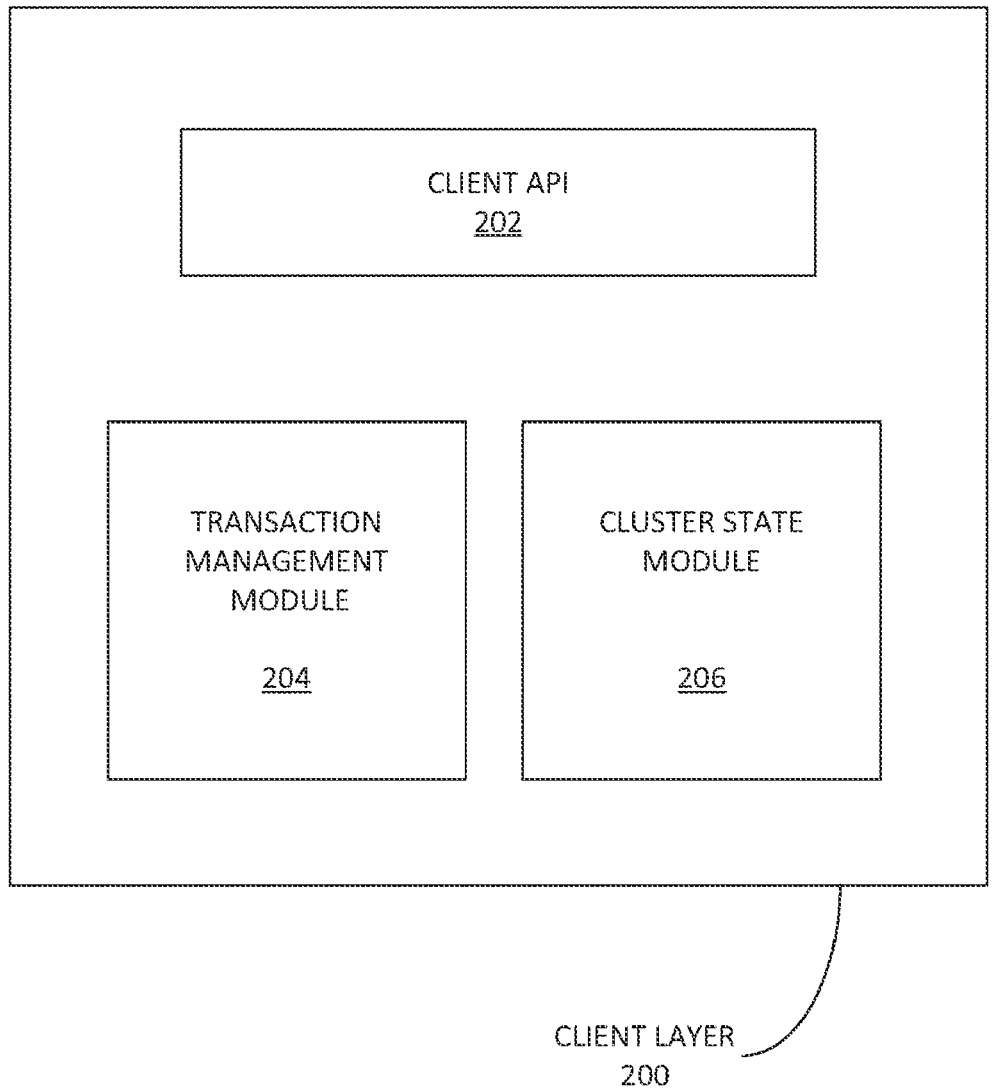
FIG. 2 depicts a block diagram of an example of a client layer of the DDBS, according to some embodiments.

FIG. 2 depicts a block diagram of an example of a client layer 200, according to some embodiments. Client layer 200 can provide a 'smart client' layer between the application and the server. Client layer 200 can perform the administrative tasks needed to manage communication with the node. For example, client layer 200 can determine an optimal server for each transaction, handle retries, and/or manages any cluster reconfiguration issues in a way that is transparent to the application. Client layer 200 can implement a TCP/IP connection pool. In some embodiments, client layer 200 can include a linkable library that can communicate with ate cluster (e.g. nodes 108 A-N.

Client layer 200 can include client API 202. Client API 202 can provide an interface for reading and writing data to DDBS 100. Client API 202 architecture can based around a key-value store where the 'value' may actually be a set of named values (e.g. similar to columns in a traditional relational database management system (RDBMS)). In this way, client application 104 A-N can read or write one value and/or multiple values with a single API call. In addition, Client API 202 can implement optimistic locking to allow consistent and reliable read-modify-write cycles. Additional operations available with Client API 202 can include batch processing, auto-increment, and/or reading/writing the entire contents of the database. A reading/writing the entire database operation can be used for backup and restore operations. Client API 202 can also provide several optional parameters that allow application developers to modify the operation of transaction requests. These parameters include the request timeout (e.g. used in real-time operations where transactions are valid if they can be completed within a specified time) and the policy governing automatic retry of failed requests.

Cluster state module 206 can track the current configuration of the server cluster (e.g. nodes 108 A-N). For example, cluster state module 206 can periodically communicate with the cluster and maintain an internal list of server nodes. Any changes to the cluster size or configuration can be automatically tracked by cluster state module 206. Thus, the state of the cluster can be available to client application 104 A-N.

When a transaction request comes in from the application, transaction management module 204 can format the transaction request into an optimized wire protocol for transmission to a server in the cluster. Transaction management module 204 can use its knowledge of the cluster configuration (e.g. from Cluster state module 206) to determine which server is most likely to contain the requested data and parcels out the request appropriately. As part of transaction management, transaction management module 204 can maintain a connection pool that tracks the active TCP connections associated with outstanding requests. Transaction management module 204 can use its knowledge of outstanding requests to detect transactional failures that have not risen to the level of a server failure within the cluster. Depending on the desired policy, transaction management module 204 can automatically retry failures and/or notify client application 104 A-N of the transaction failure. If transactions on a particular node fail too often (e.g. beyond a specified tolerance rate), transaction management module 204 can route requests that would normally be handled by that node to a different node that also has a copy of the requested data.

Figure 3:
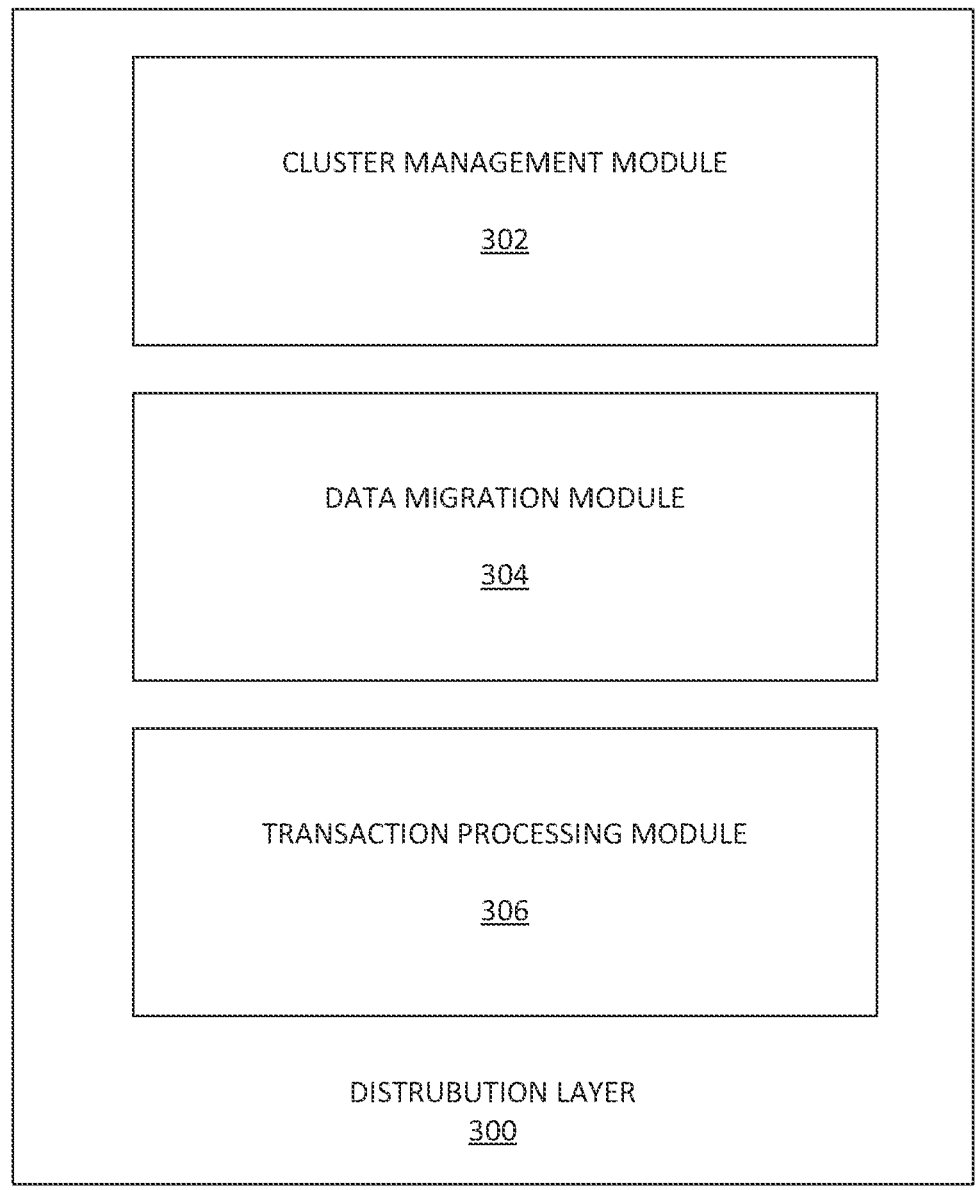
FIG. 3 depicts a block diagram of an example of a distribution layer of the DDBS, according to some embodiments.

FIG. 3 depicts a block diagram of an example of a distribution layer 300, according to some embodiments. Distribution layer 300 can manage the scalability of the cluster of nodes 108 A-N, and/or providing many of the ACID reliability guarantees. In some embodiments, distribution layer 300 can be implemented as a 'shared nothing' scheme. Thus, distribution layer 300 may not include separate 'managers'. Distribution layer 300 can cluster management module 302, data migration module 306, and transaction management module 308. In some embodiments, distribution layer 300 can manage the steps of process 600 of FIGS. 6A-B infra.

Cluster management module 302 can determine which nodes are currently in the cluster. For example, each node can periodically communicate a heartbeat signal to all the other nodes, informing them that it is functional. If any node detects a new node, or fails to receive heartbeats from an existing node, that node's cluster management module 302 can trigger a Paxos-consensus voting process between all the cluster nodes. This process can determine which nodes are considered part of the cluster, as well as ensures that all nodes in the cluster maintain a consistent view of the system. Cluster management module 302 can be set up to run over multicast IP and/or unicast. In the face of heavy loading, e.g. when heartbeats could be delayed, the system can count any transactional requests between nodes as a type of heartbeat signal. Once membership in the cluster has been agreed upon, the individual nodes can use a distributed hash algorithm to divide the primary index space into data 'slices' and then to assign read and write masters and replicas to each of the slices. In this way, the system can scale sans a master and thus eliminate the need for additional configuration that may be required in a sharded environment. After a cluster reconfiguration, data migration between the slices can be handled by data migration module 304.

When a node is added or removed from the cluster, data migration module 304 can be invoked to transition the data to and from nodes as appropriate for the new configuration. Data migration module 304 can balance the distribution of data across the cluster nodes, and ensure that each piece of data is duplicated across nodes as specified by the system's configured replication factor. The data migration process by which data is moved to the appropriate node can be transparent to the both the client 102 A-N and the client application 104 A-N. Higher prioritized transactions such as reads, writes, transfer of control, and/or heartbeat signals can be prioritized above lower-prioritized transactions such as data migration transactions. In this way, DDS 100 can fulfill transactional requests even when the data has not been migrated to the 'correct' node. This prioritization ensures that the system is functional even while servers are coming on and/or off line, and that changes to the configuration of the cluster do not bring the system down.

Transaction processing module 306 can provide many of the consistency and isolation guarantees of the DDS 100. Transaction processing module 306 can processes the transaction requests from client 102 A-N, including resolving conflicts between different versions of the data that may exist when the system is recovering from being partitioned. For example, a client may have identified the correct node responsible for processing the transaction (e.g. a read replica in the case of a read request, or in the case of a write request, the write master for that data's slice). Transaction requests that involve simultaneous reads and writes can be allocated to the write master. In this situation, transaction processing module 306 can look up the data, apply the appropriate operation and return the result to the appropriate client. If the request modifies data, transaction processing module 306 can also ensure immediate consistency within the system. For example, before committing the data internally and returning the result to the client, transaction processing module 306 can first propagate the changes to all other replicas in other nodes. In some cases, the node that receives the transaction request may not contain the data needed to complete the transaction. This case may occur, for example, if the cluster configuration has recently changes and client's information about the duster state is briefly no longer current. In this situation, transaction processing module 306 can forward the transaction request to another transaction processing module in the correct node that is responsible for the data. This transfer of control, like data migration itself, can be transparent to the client. Finally, transaction processing module 306 can be responsible for resolving conflicts that can occur when a cluster is recovering from being partitioned. In this case at some point in the past, the cluster may have partitioned into two (or more) separate pieces. While the cluster was partitioned, a client application may have wrote two different values to what should be the identical copies of the data. When the cluster reconfigures, there may be a conflict over the actual value that data. In this case, transaction processing module 306 can detect this condition, and resolve it in one of two ways. If the system has been configured for automatic conflict resolution, transaction processing module 306 can consider the data with the latest timestamp to be canonical. On a read operation, that data can be returned to the client. If the system has not been configured for automatic conflict resolution, transaction processing module 306 can send both copies of the data to the client (where they are then forwarded to the client application). In this way, the responsibility to decide which copy is correct can be allocated to the client application.

Figure 4:
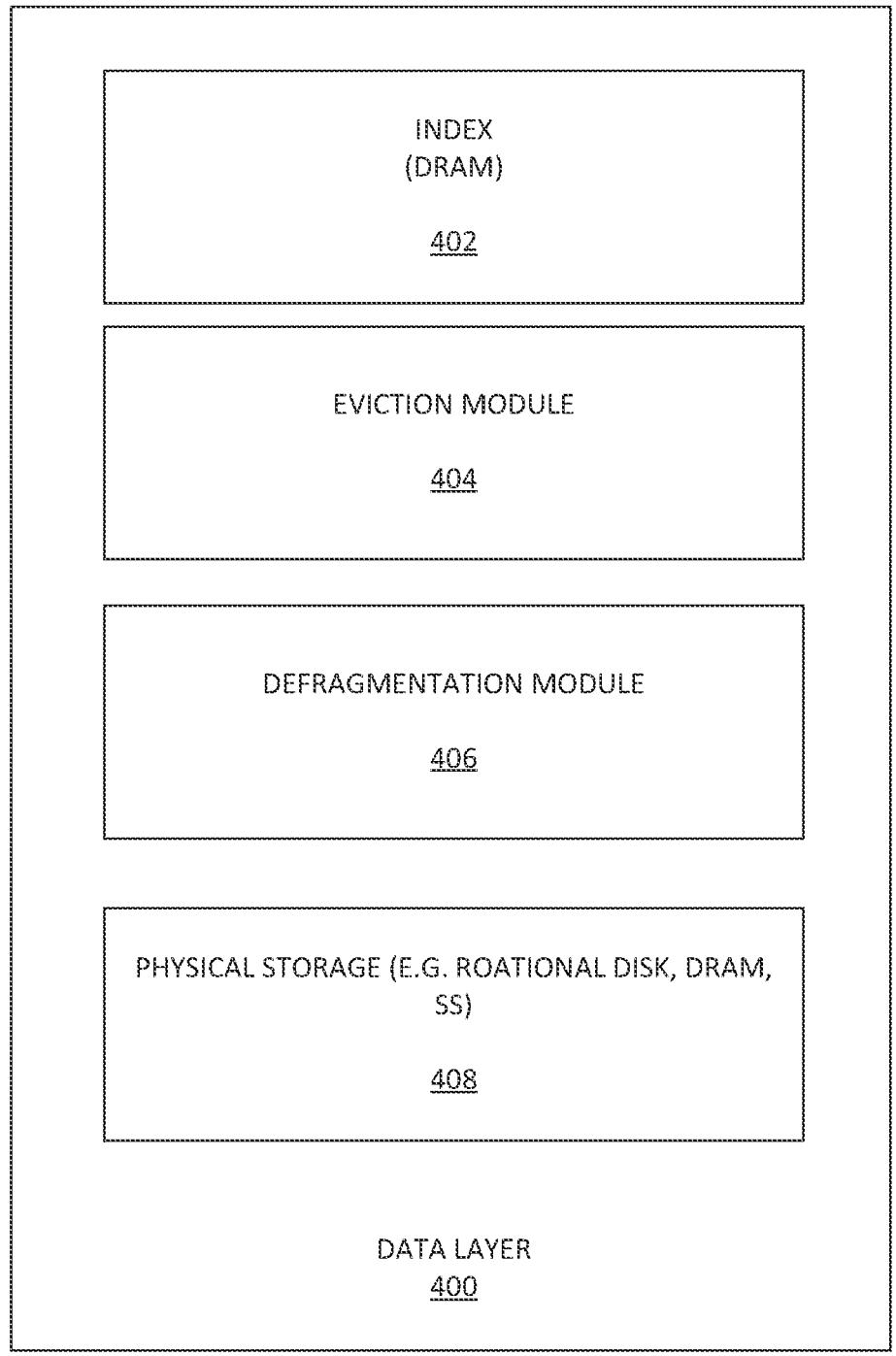
FIG. 4 depicts a block diagram of an example of a data layer of the DDBS, according to some embodiments.

FIG. 4 depicts a block diagram of an example of a data layer 400, according to some embodiments. Data layer 400 can include various indexes and/or data stored in each node (e.g. nodes 108 A-N). Data layer 400 can manage interactions with the physical storage. Data layer 400 can also include modules that remove old data from the database and/or defragment the physical storage.

In some embodiments, data layer 400 can utilize a key-value store where the keys can be associated with a set of named values. At the highest level, data can be collected into policy containers called 'namespaces'. Namespaces can be configured when the cluster is started, and can be used to control retention and reliability requirements for a given set of data. For example, one system configuration policy can be the replication factor. The replication factor can control the number of stored usage copies of each piece of data. Changing the replication factor can enable the system to trade increased storage requirements for improved resiliency to simultaneous hardware allures.

Within a namespace, the data can be subdivided into 'sets' and 'records'. Each record can have an indexed 'key' that is unique in the set, as well as one or more named 'bins' (similar to columns) that hold values associated with the record. Values in the bins can be strongly typed, and can include strings, integers, and binary data, as well as language-specific binary blobs. The binary blobs can be automatically serialized and de-serialized by the system. It is noted that although the values in the bins may be typed, the bins themselves are not. Thus, the bin value in one record may have a different type than the bin value in different record. Although these structures may seem at first glance to be very similar to the familiar RDBMS structures, there are important differences. For example, unlike RDBMS systems, the present system can be entirely schemaless. In this way, sets and bins do riot need to be defined up front, but can be added during runtime if additional flexibility is needed. Each record can also be tagged with a generation count. The generation count can be the number of times that the record has been modified. This number is used to reconcile data if the cluster breaks apart (e.g. with partition operations) and rejoins. Generation counts can also be used by the clients in CAS operations to ensure that they are modifying a known copy of the data.

The data can be stored in various physical storage media 408, such as dynamic random-access memory (DRAM), traditional rotational media, and solid-state drive (SSD). Each namespace can be configured separately within each storage-media type. This configuration flexibility can enable an application developer to put a small namespace that is frequently accessed in DRAM, but put a larger namespace in less expensive storage such an SSD.

Indices (e.g. via a primary key) can be stored in DRAM for substantially rapid availability. Data writes to disk can be performed in large blocks to minimize latencies that occur on both traditional rotational disk and SSD media. Data layer 400 can also be configured to store data in direct format (e.g. using the drive as a low-level block device without a format or file system) to provide additional speed optimization for real-time critical systems. For example, data layer 400 can store indices for 100 million records in seven (7) gigabytes of DRAM. The contents of each namespace can be spread evenly across every node in the cluster, and duplicated as specified by the namespace's configured replication factor. The location of any piece of data in the system can be determined algorithmically by data layer 400 without the use of a stored lookup table.

Data layer 400 can include two additional modules: the defragmentation module 406 and the eviction module 404. The defragmentation module 406 and the eviction module 404 can ensure that there is space both in DRAM and disk to write new data. Defragmentation module 406 can track the number of active records on each block on disk, and reclaim blocks that fall below a minimum level of use. Eviction module 404 can manage removing references to expired records, as well as reclaiming memory if the system gets beyond a set high-water mark. When configuring a namespace, an administrator can specify the maximum amount of DRAM used for that namespace, as well as the default lifetime for data in the namespace. Under normal operation, eviction module 404 can locate data that that has expired, freeing the index in memory and releasing the record on disk. Eviction module 404 can also track the memory used by the namespace, and release older, although not necessarily expired, records if the memory exceeds the configured high-water mark. By allowing eviction module 404 to remove old data when the system hits its memory limitations, DBS 100 can effectively be used as an LRU cache. It is noted that the age of a record can be measured from the last time it was modified, and that a client application can override the default lifetime any time it writes data to the record. Client application may also instruct the DBS 100 that a particular record should never be automatically evicted.

Figure 5:
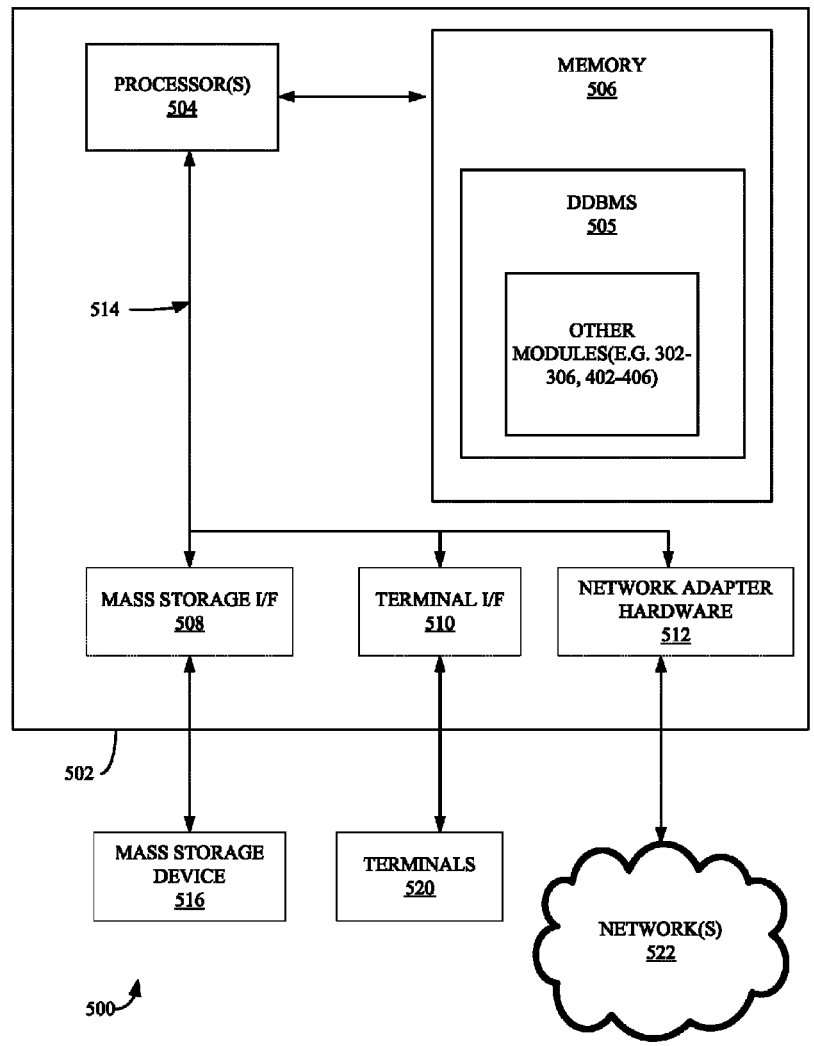
FIG. 5 is a block diagram illustrating a computing system, according to some embodiments.

FIG. 5 depicts an exemplary computing system 500 configured to perform any one of the processes described herein. In this context, computing system 500 may include, for example, a processor, memory, storage, and I/O devices (e.g., monitor, keyboard, disk drive, Internet connection, etc.). However, computing system 500 may include circuitry or other specialized hardware for carrying out some or all aspects of the processes. In some operational settings, computing system 500 may be configured as a system that includes one or more units, each of which is configured to carry out some aspects of the processes either in software, hardware, or some combination thereof.

FIG. 5 is a block diagram illustrating a computing system 500. The computing system 500 is based upon a suitably configured processing system adapted to implement one or more exemplary embodiments. Any suitably configured processing system can similarly be used as the computing system 500 by embodiments such as servers residing in cluster nodes, a personal computer, workstation, a distributed database server, or the like. The computing system 500 includes a computer 502. The computer 502 has a processor(s) 504 that is connected to a memory 506, mass storage interface 508, terminal interface 510, and network adapter hardware 512. A system bus 514 interconnects these system components. The mass storage interface 508 is used to connect mass storage devices, such as data storage device 516, to the computer 502. Examples of data storage 516 can include those examples discussed supra (rotating hard disk systems, SSD flash systems, DRAM, and the like), as well others such as optical drives. Data storage 516 may be used to store data to and read data from a computer-readable medium or storage product.

Memory 506, in one embodiment, includes a distributed database management system (DDBMS) 505. In some example embodiments, memory 506 can also include one or more modules such as those discussed in FIGS. 1 and 4 supra (e.g. transaction processing module 306, index 402, etc.). Although illustrated as concurrently resident in the memory 506, it is clear that respective components of the memory 506 are not required to be completely resident in the memory 506 at all times or even at the same time. In one embodiment, the computer 502 utilizes conventional virtual addressing mechanisms to allow programs to behave as if they have access to a large, single storage entity, referred to herein as a computer system memory, instead of access to multiple, smaller storage entities such as the memory 506 and data storage device 516. In some embodiments, additional memory devices (such as a DRAM cache) can be coupled with computer 502 as well.

Although only one CPU 504 is illustrated for computer 502, computer systems with multiple CPUs can be used equally effectively. Some embodiments can further incorporate interfaces that each includes separate, fully programmed microprocessors that are used to off-load processing from the CPU 504. Terminal interface 510 is used to directly connect one or more terminals 520 to computer 502 to provide a user interface to the computer 502. These terminals 520, which are able to be non-intelligent or fully programmable workstations, are used to allow system administrators and users to communicate with computer 502. The terminal 520 can also include other user interface and peripheral devices that are connected to computer 502 and controlled by terminal interface hardware included in the terminal I/F 510 that includes video adapters and interfaces for keyboards, pointing devices, and the like.

An operating system (not shown) included in the memory is a suitable multitasking operating system such as the Linux, UNIX, Windows XP, and Windows Server operating system. Embodiments are able to use any other suitable operating system. Some embodiments utilize architectures, such as an object oriented framework mechanism, that allows instructions of the components of operating system to be executed on any processor located within computer 502. The network adapter hardware 512 is used to provide an interface to a network 522. Some embodiments are able to be adapted to work with any data communications connections including present day analog and/or digital techniques or via a future networking mechanism.

Although the exemplary embodiments are described in the context of a fully functional computer system, those skilled in the art will appreciate that embodiments are capable of being distributed as a program product via CD or DVD, e.g., a CD ROM, or other form of recordable media, or via any type of electronic transmission mechanism. At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, and Java) or some specialized application-specific language.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

B. Operation

Figure 6A:
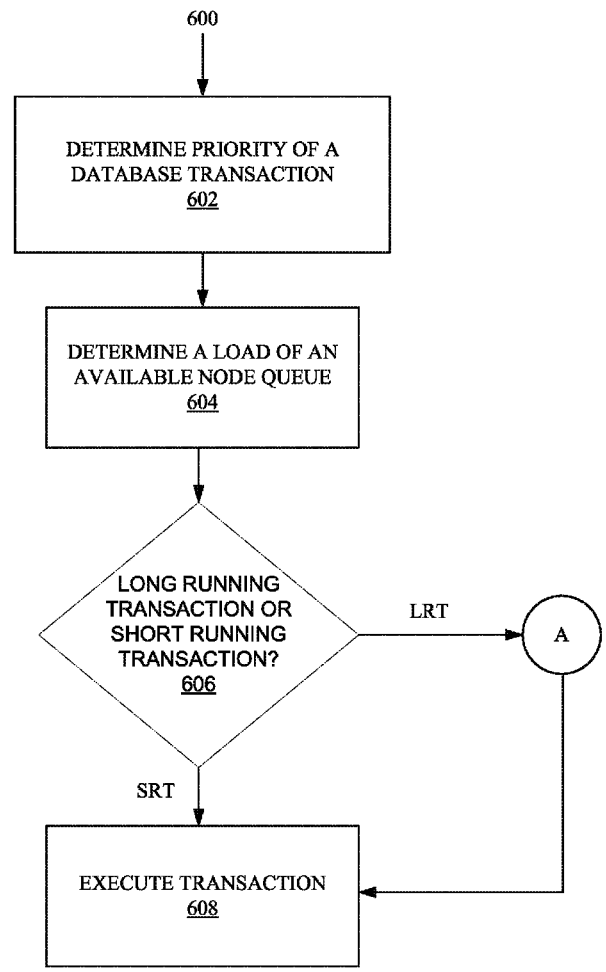
FIGS. 6A-B illustrates an exemplary process for real-time transaction scheduling of a database transaction in a transaction queue of a distributed database node, according to some embodiments.
Figure 6B:
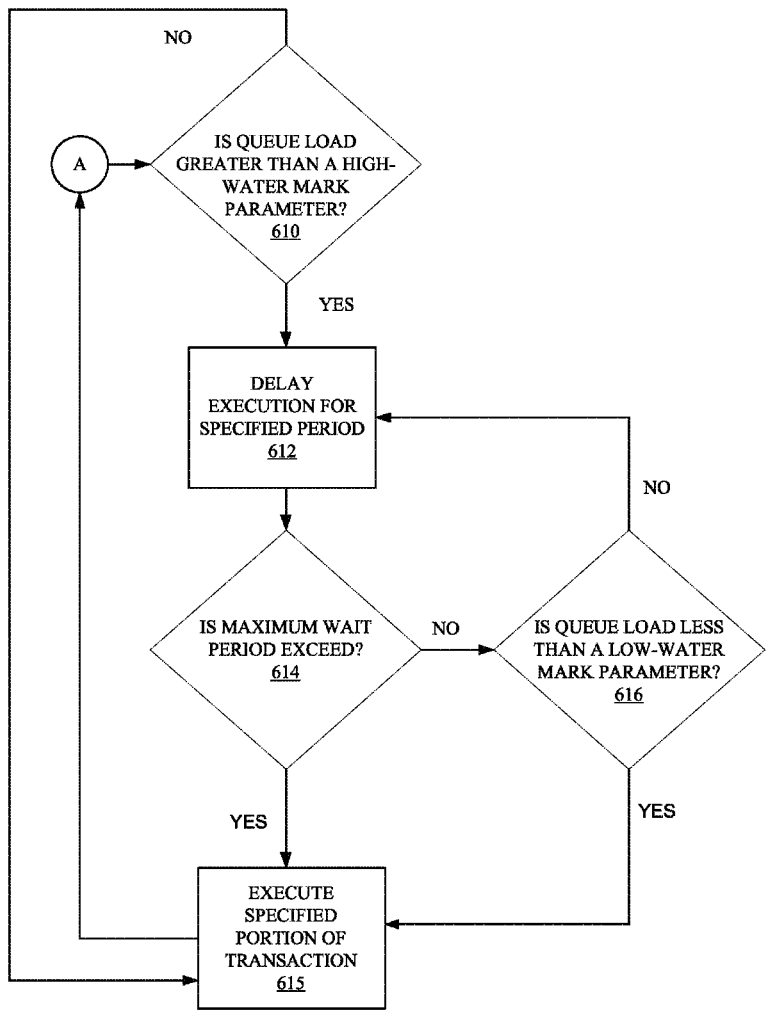

FIGS. 6A-B illustrates an exemplary process for real-time transaction scheduling of a database transaction in a transaction queue of a distributed database node. In step 602 of process 600, a priority of a transaction is determined. Several factors can be utilized to determine the priority of the transaction. Exemplary factors include the class of the transaction (e.g. transactions such as reads, writes, transfer of control, and/or heartbeat signals can be prioritized above data migration transactions), the relative size of the transaction, the estimated time to complete the transaction, the metrics (e.g. turn-around time) of a service level agreement (SLA) that may be associated with the transaction, and the like. As a result of applying the factors, a particular database transaction may be prioritized as a higher or tower priority with regards to other transactions in a node's transaction queue.

It should be noted, that an optional step (not shown) can be included which examines a load metric (e.g. length in terms of pending transactions) of a queue in a node. If the length the queue is lower than a specified threshold, the database transaction can be executed according to step 608 without implementing steps 602-606 of process 600. On the other hand, if the length of the queue is greater than the specified threshold, the DDBMS 505 can implement process 600 beginning at step 602.

Returning to step 602, an example of a transaction that may receive a lower priority ranking may be 'long-running transactions' (LRT) such as a cluster-rebalancing transaction, distributed database backup transaction, database restore transaction, and the like. Examples of database transaction that may receive a higher priority ranking may be 'short-running transactions' (SRT) such as reads, writes, transaction with an SLA that requires processing within a specified period of time, and the like.

In step 604, the load of a node's queue is determined. The load level of the queue can be utilized to determine the various parameters involved in subsequent steps of process 600. For example, if the queue is heavily loaded, parameters such as the delay period of step 612 or the specified portion of the LRT that is processed in step 614 can be dynamically adjusted in relation to queue load. It should be noted that in some embodiments, some or all of the portions of step 604 can be performed between other steps of process 600. In this way, the parameters of process 600 can be dynamically updated according to the real-time state of the queue. In some embodiments, step 604 can involve determining the load of more than one queue in a node. In this embodiment, the following steps can be modified in order for the LRT to be processed through multiple queues.

In step 606, it is determined whether the database transaction is an LRT or an SRT. If the database transaction is an SRT, the transaction is placed into the queue and executed accordingly in step 408. If the database transaction is an LRT, the transaction proceeds to step 610 of FIG. 6B. It should be noted that the use of LRT and SRT are provided as examples of types of database transaction classifications that can be processed by process 600.

In step 610 of FIG. 6B it is determined whether the queue load is greater than a high-water mark (HWM) parameter (e.g. an upper-limit value). The HWM (as well as the low-water mark (LWM) of step 616 infra) parameter can be defined according to the various attributes of a queue (as previously stated). In an example embodiment, the high-water mark parameter can include the number and/or classification of transactions already waiting in the queue. The HWM parameter can also be dynamically adjusted according to the various attributes of the DDS and the particular transaction classification as well. Accordingly, the HWM parameter may vary dynamically during sequential iterations of the steps of FIG. 6B.

In step 610, if the queue lode is below the specified high-water mark parameter, the LRT then proceeds to step 608. If the queue load is above the specified high-water mark parameter, the LRT then proceeds to step 612. In step 612, the execution of the LRT is delayed for a specified period. Again, in one embodiment, the period can be dynamically set according to such factors as the various attributes of the DDS (such as those provided supra) and the particular transaction classification. In step 614, it is determined if the maximum wait period is exceed.

In step 615, a specified portion of the LRT can be executed. It should be noted that step 615 can be optionally applied in iterations of the steps of FIG. 6B in certain embodiments. For example, step 615 may not be executed if the queue is greater than a specified parameter and a certain number of SRT's with a higher priority (e.g. as set by an SLA) are in the queue. In one embodiment, the specified portion of the LRT can be defined as a portion of the LRT such as a certain number of records of the LRT. This specified number can also be varied (e.g. from zero to n) per iteration of the steps of FIG. 6B according to real-time attributes of the DDB such as queue load. The portion of the LRT that is executed then proceeds to step 608. The remaining portion of the LRT proceeds to step 416 where it is determined if the queue load is less than a specified LWM. If the queue load is less than the specified LWM, the remaining portions of the LRT proceed to step 608. If the queue load is greater than the specified LWM, the remaining portions of the LRT return to step 612. As discussed supra, the particular parameters of the next iteration of the remaining steps may then be adjusted according to the real-time attributes of relevant system components. It should be noted that the term 'real-time' means substantially in real time assuming system latencies and delays.

In some example embodiments, the operations and steps of FIGS. 6A-B can be integrated with other known methods of transaction prioritization such as round robin, first in first out (FIFO) and last in first out (LIFO) processes. Additionally, in some example embodiments, the systems of FIGS. 1-5 can be utilized to implement the steps and processes of FIGS. 6A-B. Furthermore, in one example embodiment, the steps and processes of FIGS. 6A-B can be modified to utilize other gradations of transactions beyond the set of LRT and SRT. For example, a gradation of transaction classes can be determined and the separate versions of FIG. 6B can be used for each transaction class.

C. Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method in a distributed database system, the distributed database system comprising a processor, the method comprising:
    receiving a database transaction with a node of the distributed database system;
    determining a priority of the database transaction;
    determining a load of a transaction queue of the node;
    delaying execution of the database transaction if the load of the transaction queue is greater than a first-water mark, wherein the database transaction is delayed for a period;
    executing a portion of the database transaction after the period of time; and
    determining if the load of the queue is below a second-water mark after the period.

2. The method of claim 1 further comprising:
    processing a remaining portion of the database transaction if the load of the queue is below the second-water mark.

3. The method of claim 1 further comprising:
    delaying execution of the database transaction if the load of the transaction queue for the period if the load of the queue is above the second-water mark.

4. The method of claim 1, wherein the distributed database system comprises a scalable NoSQL database.

5. The method of claim 4, wherein the NoSQL database is implemented with a shared-nothing architecture.

6. The method of claim 1, wherein the first-water mark comprises an upper-limit value.

7. The method of claim 6, wherein the upper-limit value is determined according to a number of database transactions in the transaction queue.

8. The method of claim 7, wherein the upper-limit value comprises a classification of each database transaction in the transaction queue.

9. The method of claim 8, wherein the upper-limit value is dynamically adjusted according to the classification of each database transaction in the transaction queue.

10. The method of claim 9, wherein the second-water mark comprises a low-water mark.

11. The method of claim 10, wherein the lower-limit mark is dynamically adjusted according to the classification of each database transaction in the transaction queue.

12. A non-transitory computer readable storage medium containing program instructions for real-time transaction scheduling in a distributed database, wherein execution of the program instructions by one or more processors of a computer system causes the one or more processors to carry out the steps of:
    receiving a database transaction with a node of the distributed database system;
    determining a priority of the database transaction;
    determining a load of a transaction queue of the node;
    delaying execution of the database transaction if the load of the transaction queue is greater than a first-water mark, wherein the database transaction is delayed for a period;
    executing a portion of the database transaction after the period of time; and
    determining if the load of the queue is below a second—water mark after the period.

13. The non-transitory computer-readable storage medium of claim 12, wherein the distributed database system comprises a scalable NoSQL database.

14. The non-transitory computer-readable storage medium of claim 12, wherein the NoSQL database is implemented with a shared-nothing architecture.

15. A distributed database system comprising:
    a processor;
    a distributed database comprising a cluster of server nodes;
    a server node comprising a distribution layer that:
    receives a database transaction,
    determines a priority of the database transaction,
    delays execution of the database transaction if the load of the transaction queue is greater than a first-water mark, wherein the database transaction is delayed for a period,
    determines a load of a transaction queue of the node,
    executes a portion of the database transaction after the period of time, and
    determines if the load of the queue is below a second-water mark after the period.

16. The distributed database system of claim 15, wherein the distributed database system comprises a scalable NoSQL, database.

17. The distributed database system of claim 16, wherein the NoSQL database is implemented with a shared-nothing architecture.

18. The distributed database system of claim 15, wherein the first-water mark comprises a high-water mark.

19. The distributed database system of claim 18, wherein the high-water mark is determined according to a number of database transactions in the transaction queue.

20. The distributed database system of claim 19, wherein the high-water mark s determined according to a classification of at least one database transaction in the transaction queue.

* * * * *